(12) United States Patent
Yamada

(10) Patent No.: US 6,988,766 B2
(45) Date of Patent: Jan. 24, 2006

(54) SEALING STRUCTURE OF SLIDING ROOF OF MOTOR VEHICLE

(75) Inventor: Yoshinobu Yamada, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/859,131

(22) Filed: Jun. 3, 2004

(65) Prior Publication Data

US 2005/0001458 A1   Jan. 6, 2005

(30) Foreign Application Priority Data

Jun. 4, 2003   (JP)   ............................. 2003-158795

(51) Int. Cl.
*B60J 10/12*   (2006.01)
(52) U.S. Cl. .................. 296/216.06; 49/498.1
(58) Field of Classification Search ............ 296/216.06–216.09; 49/498.1
See application file for complete search history.

(56) References Cited

U.S. PATENT DOCUMENTS

| | | | | |
|---|---|---|---|---|
| 3,178,778 A | * | 4/1965 | Reahard ............ | 49/496.1 |
| 6,270,154 B1 | * | 8/2001 | Farber ............... | 296/213 |
| 6,685,263 B2 | * | 2/2004 | Sawada et al. ..... | 296/216.06 |
| 2001/0033097 A1 | * | 10/2001 | Nozaki ............. | 296/216.09 |
| 2004/0079032 A1 | * | 4/2004 | Russell et al. ..... | 49/498.1 |

FOREIGN PATENT DOCUMENTS

| | | | | |
|---|---|---|---|---|
| JP | 402085016 | * | 3/1990 | ........ 49/498.1 |
| JP | A-H07-35142 | | 6/1995 | |
| JP | A-2000-335255 | | 12/2000 | |
| JP | A-2002-356113 | | 12/2002 | |

* cited by examiner

*Primary Examiner*—Dennis H. Pedder
(74) *Attorney, Agent, or Firm*—Posz Law Group, PLC

(57) ABSTRACT

A sealing structure for providing a seal between panels composing a roof panel with excellent sealing properties and good appearance therearound. The roof panel includes at least one sliding panel and non-sliding panels arranged adjacent to the sliding panel in a longitudinal direction of a vehicle roof, and a weather strip is attached to provide a seal between the sliding panel and the non-sliding panels. The weather strip has a base portion for attachment to a frame member, and a tubular seal portion formed integrally with the base portion on the upper side thereof. The tubular seal portion has a bridge part in an interior space thereof to support the tubular seal portion against the sliding panel which is in its closed position.

13 Claims, 5 Drawing Sheets

US 6,988,766 B2

SEALING STRUCTURE OF SLIDING ROOF OF MOTOR VEHICLE

CROSS-REFERENCE TO RELATED APPLICATION

This application is related to and claims priority from Japanese patent application No. 2003-158795, incorporated herein by reference.

BACKGROUND OF THE INVENTION

1. Field of the Invention

The present invention relates to a sealing structure for providing a seal between panels composing a roof panel to be attached to a roof opening portion of a motor vehicle and, more particularly, to a sealing structure for providing a seal between a sliding panel and its adjacent panels of the roof panel.

2. Description of Related Art

As shown in FIG. 1, a roof panel 10 is mounted to open and close a roof opening portion 12 formed in a roof 14 of a motor vehicle. And conventionally, the roof panel 10 is normally composed of a single panel.

FIG. 2 is a partially cut away cross-section, taken along line A—A of FIG. 1. As shown, a weather strip 16 is attached to a periphery of the roof panel 10 to provide a seal between the roof panel 10 and the roof opening portion 12.

The weather strip 16 includes a base portion 18 to be attached to the roof panel 10, and a tubular portion 20 integrally formed with the base portion 18. The base portion 18 has a trim part having a generally U-shaped cross-section for holding a flange of a frame provided under the roof panel 10, and attaching the weather strip 16 thereto.

When the roof panel 10 is closed, the tubular portion 20 contacts the roof opening portion 12 of the roof 14, and provides a seal between the roof opening portion 12 and the roof panel 10 (Japanese Laid-open Patent Publication No. 2000-335255, pages 3 to 4, and FIG. 1, ex.). The base portion 18 thus arranged, however, has increased dimensions, and accordingly, the weight thereof may undesirably increase.

Furthermore, it has been demanded to enlarge the opening area of the roof 14 for brightening a vehicle compartment, enabling a good airflow, improving a relaxed feeling and obtaining a good view from the vehicle compartment.

Where the roof panel 10 is composed of a single sliding panel, the dimensions and weight thereof increase, and the sliding distance thereof becomes long, thereby enlarging the driving mechanism for the roof panel 10, and deteriorating the designing properties thereof. And when the roof panel 10 is opened, it may project rearward of the vehicle body.

Under the above circumstances, it has been tried to compose the roof panel 10 of a plurality of panels that are arranged in a longitudinal direction of the roof 14. According to this arrangement, sealing is needed between adjacent panels.

As shown in FIG. 3, to provide a seal between adjacent panels, weather strips 22 and 24 are respectively attached to a rear edge of a front-side panel 26 and a front edge of a rear-side panel 28 (Japanese Laid-open Utility model Publication No. Hei 7-35142, pages 6 to 8, FIG. 2, ex.).

To attach the weather strips 22 and 24 to the panels 26 and 28, respectively, it takes much trouble and time, and accordingly, production costs may increase.

In addition, the weather strips 22 and 24 may not always contact each other in a proper condition, because of the variation of the assembling state of the panels 26 and 28, and the deformation of the weather strips 22 and 24 attached to the panels 26 and 28.

On the other hand, weather strips may have a tubular seal portion for improving the sealing properties. When the roof panel 10 is opened, a seal wall of the tubular seal portion may maintain a close contact with a base portion of the weather strip without returning to its original protruded configuration. In addition, the seal wall of the tubular seal portion may generate noise when separating from the base portion of the weather strip. And the compressed tubular seal portion may project outwardly from a space between the panels 26 and 28 to deteriorate the appearance therearound.

The roof panel 10 may be composed of three panels, and rear-side two panels thereof may be made slidable frontward and rearward (Japanese Laid-open Patent Publication No. 2002-356113, pages 2 to 4, FIG. 2, ex.).

In this case, the mechanism for sliding the panels becomes large, and the sealing structure between the sliding panels, and between the sliding panels and the roof opening portion becomes complex. Accordingly, it has been tried to decrease the number of the sliding panels to one, for example.

To provide a seal between the sliding panel and an adjacent non-sliding panel, a weather strip is attached to the sliding panel, or a frame member provided along the roof opening portion 12.

Where the weather strip is attached to the frame member, the tubular seal portion of the weather strip may be pushed by the sliding panel that is slid to its closing position. Consequently, the tubular seal portion may be deformed abnormally and be not located in position between the sliding panel and its adjacent panel, thereby lowering the sealing properties therebetween. And the tubular seal portion may protrude outwardly from a space between the sliding panel and its adjacent panel to deteriorate the appearance around the roof panel, and cause the increase of the air resistance as well as the generation of wind noise.

SUMMARY OF THE INVENTION

Accordingly, it is an object of the present invention to provide a sealing structure for a roof panel of a motor vehicle, which is capable of providing a seal between a plurality of panels composing the roof panel, inclusive of a sliding panel, with excellent sealing properties and good appearance.

The sealing structure in accordance with the present invention has a roof panel composed of a plurality of panels inclusive of at least one sliding panel, which are arranged in a longitudinal direction of a vehicle roof. A frame member is secured along the roof opening portion under the roof panel, and a weather strip is attached to the frame member. The weather strip includes a base portion for attachment to the frame member, and a tubular seal portion that is formed integrally with the base portion on the upper side thereof for providing a seal between the sliding panel and other panels. The tubular seal portion has a bridge part in an interior space thereof, which curves toward an upper part of the tubular seal portion. One end of the bridge part is connected to the tubular seal portion in a position slightly below a pushing position of an edge of the sliding panel in a closed state, and the other end of the bridge part is connected to the base portion.

According to this arrangement, since the roof panel composed of a plurality of panels which are arranged in a longitudinal direction of a vehicle roof is attached to the roof opening portion of the vehicle body, the dimensions of each panel can be decreased so that the opening area of the roof opening portion can be readily enlarged. Accordingly, the vehicle compartment can be brightened, a good view from the vehicle compartment can be effected, and a relaxed feeling can be improved.

Since at least one panel is a sliding panel while other panels are non-sliding panels, the driving mechanism for the sliding panel can be made simple and small, compared to the case of all panels being sliding panels.

Since sealing between the sliding panel and other panels is effected by the weather strip, a space therebetween can be securely sealed where the roof panel is divided into a plurality of panels.

Since the frame member is provided under the roof panel for attaching the weather strip along the roof opening portion of the vehicle body, it is unnecessary to attach the weather strip to the roof panel. Consequently, the roof panel can be made light-weighted, and the mechanism for sliding the sliding panel can be made simple.

The weather strip including a base portion for attachment to the frame member, and a tubular seal portion formed integrally with the base portion on the upper side thereof for providing a seal between the sliding panel and other panels, can be formed by extrusion simultaneously so that the weather strip can be readily produced.

The tubular seal portion has a bridge part in an interior space thereof. One end of the bridge part is connected to the tubular seal portion in the position slightly below the pushing position of an edge of the sliding panel that is in a closed state, and the other end of the bridge part is connected to the base portion.

According to this arrangement, when the sliding panel is closed, the sliding panel slides frontwardly, and a front edge thereof contacts and pushes the tubular seal portion frontwardly. At this time, the front edge of the sliding panel pushes the tubular seal portion in the position above the connecting position of the bridge part, whereby the bridge part supports the upper part of the tubular seal portion to prevent the tubular seal portion from tilting frontwardly.

Then, the sliding panel is lowered to push the tubular seal portion downwardly. At this time, the bridge part acts to prevent the tubular seal portion from being pushed in a deviated diagonal direction.

In addition, since the bridge part is connected to the tubular seal portion in the position slightly below the pushing position of an edge of the sliding panel which is in a closed state, the lower part of the tubular seal portion is prevented from deforming when the sliding panel slides into a closed position. Only the upper part of the tubular seal portion is depressed downwardly without tilting frontwardly or deforming abnormally.

And since the other end of the bridge part is connected to the base portion, the base portion along with the bridge part support the tubular seal portion against the frontwardly applied force. Consequently, the bridge part is prevented from deforming frontwardly, and accordingly supports the tubular seal portion securely.

Since the bridge part curves toward the upper part of the tubular seal portion, the bridge part can elastically flex frontwardly with the deformation of the upper part of the tubular seal portion, and consequently, the tubular seal portion can elastically contact the lower surface of the front edge of the sliding panel, thereby improving the sealing properties thereof.

In addition, the tubular seal portion of the weather strip is located between adjacent panels to seal a space therebetween, and accordingly, the sealing properties can be improved.

In a preferred embodiment, the roof panel is composed of a first panel, a second panel and a third panel, which are respectively composed of a transparent material, and sequentially arranged from a front side to a rear side of the vehicle body. The first panel is tiltable to lift a rear part thereof, the second panel is a sliding panel which is arranged so as to be raised and slid rearward, the third panel is fixedly secured to a roof of a vehicle body, and the weather strip is provided to seal each of a space between the first panel and the second panel, and a space between the second panel and the third panel.

According to this arrangement, since each of the three panels is composed of a transparent material, the lighting properties of the vehicle roof is improved to brighten the vehicle compartment, enable a good view, and effect an improved relaxed feeling.

Since the roof panel is divided into three panels, the dimensions of each panel can be made small, compared to a conventional undivided roof panel, thereby facilitating the attachment of each panel of small dimensions to the vehicle body.

Since, to open the roof panel, the first panel is tilted up to lift a rear edge thereof, the first panel can control airflow into the vehicle compartment to prevent a large amount of air from flowing thereinto.

Since only the second panel is a sliding panel which is raised and slid rearward to open the roof panel, the sliding mechanism can be made simple, and the vehicle weight can be reduced.

Since the third panel is fixedly secured to the vehicle roof, the opening area of the vehicle roof can be reduced while maintaining good lighting properties and relaxed feeling. In addition, since the third panel neither tilts nor slides, the construction thereof can be made simple, thereby decreasing the weight thereof and reducing the production costs.

Furthermore, weather strips, each having a tubular seal portion provided with a bridge part therein, are attached to close spaces between the first panel and the second panel, and between the second panel and the third panel.

Accordingly, when the tubular seal portions of these weather strips are pushed by any force generated due to sliding and lowering of these panels, the bridge part of each weather strip prevents the abnormal deformation of the weather strip, thereby effecting a good seal between these panels.

It is preferable that the bridge part has a thickness at least equal to the thickness of the tubular seal portion.

According to this arrangement, the rigidity of the bridge part is improved so that the tubular seal portion can be prevented from frontwardly tilting or extending over a predetermined widthwise length when pushed by the sliding panel.

It is preferable that the tubular seal portion of the weather strip has a height greater than the widthwise length of the base portion.

According to this arrangement, the tubular seal portion of the weather strip can surely contact the panels composing the roof panel, and by virtue of the bridge part, the tubular seal portion can exhibit sufficient sealing properties without tilting frontwardly.

It is preferable that the base portion of the weather strip is attached to the frame member with a double-sided adhesive tape.

According to this arrangement, the weather strip can be readily bonded to the frame member with the double-sided adhesive tape by merely pressing the base portion against the frame member. In addition, it is unnecessary to provide any clip hole in the frame member, which has been required to provide where the weather strip is attached using clips, so that any troublesome work and time for providing such clip holes are not needed, and there does not occur any water leakage from such clip holes. Furthermore, the double-sided adhesive tape acts to provide a seal between the base portion of the weather strip and the frame member.

In another preferred embodiment, the weather strip is attached to each of a front end and a rear end of the frame member such that the tubular seal portion of the weather strip contacts each of a front edge and a rear edge of the sliding panel that is in a closed position. In addition, an annular weather strip is attached to the frame member on the slightly inner side of the above-described weather strips so as to contact a lower surface of a periphery of the sliding panel which is in a closed position over the entire length thereof.

According to this arrangement, the weather strips, each having a bridge part and being attached to the front end and the rear end of the frame member, can seal the front edge and the rear edge of the roof panel including a plurality of panels.

In addition, the annular weather strip attached to the frame member on the slightly inner side of the weather strips for sealing the front edge and the rear edge of the roof panel can seal the periphery of the sliding panel over the entire length thereof, thereby preventing intruding of rain water, etc. into the vehicle compartment. Since the annular weather strip is attached to not the sliding panel but the frame member, the annular weather strip can be readily attached. And it is unnecessary to mount any retainer on the sliding panel for attaching the annular weather strip so that the weight of the sliding panel can be reduced.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
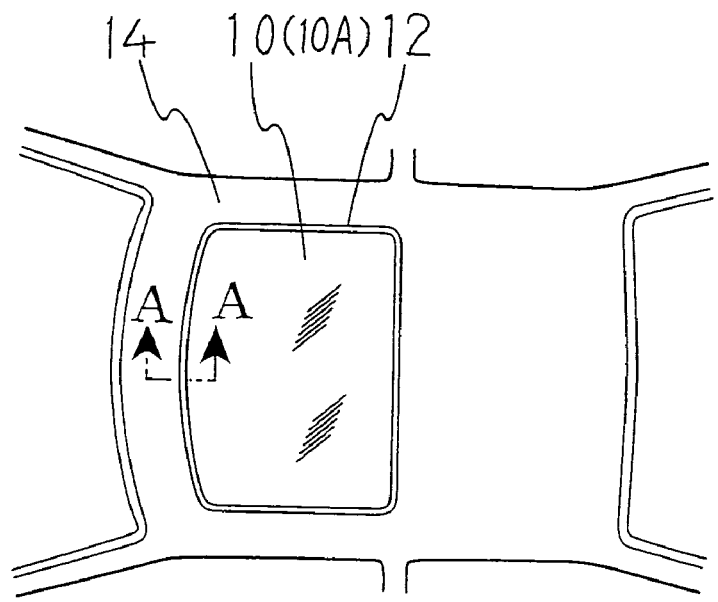
FIG. 1 is a plan view of a roof of a motor vehicle.
Figure 2:
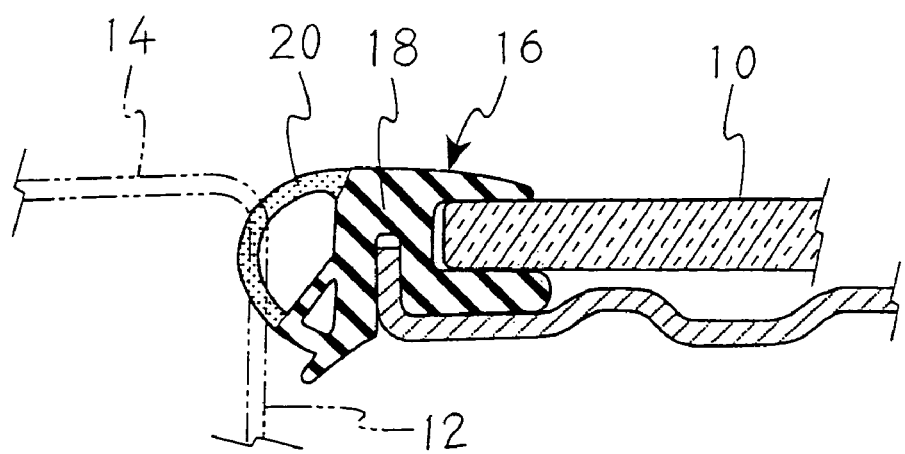
FIG. 2 is a partially cut-away cross-sectional view of one example of a conventional sealing structure, which is taken along line A—A of FIG. 1.
Figure 3:
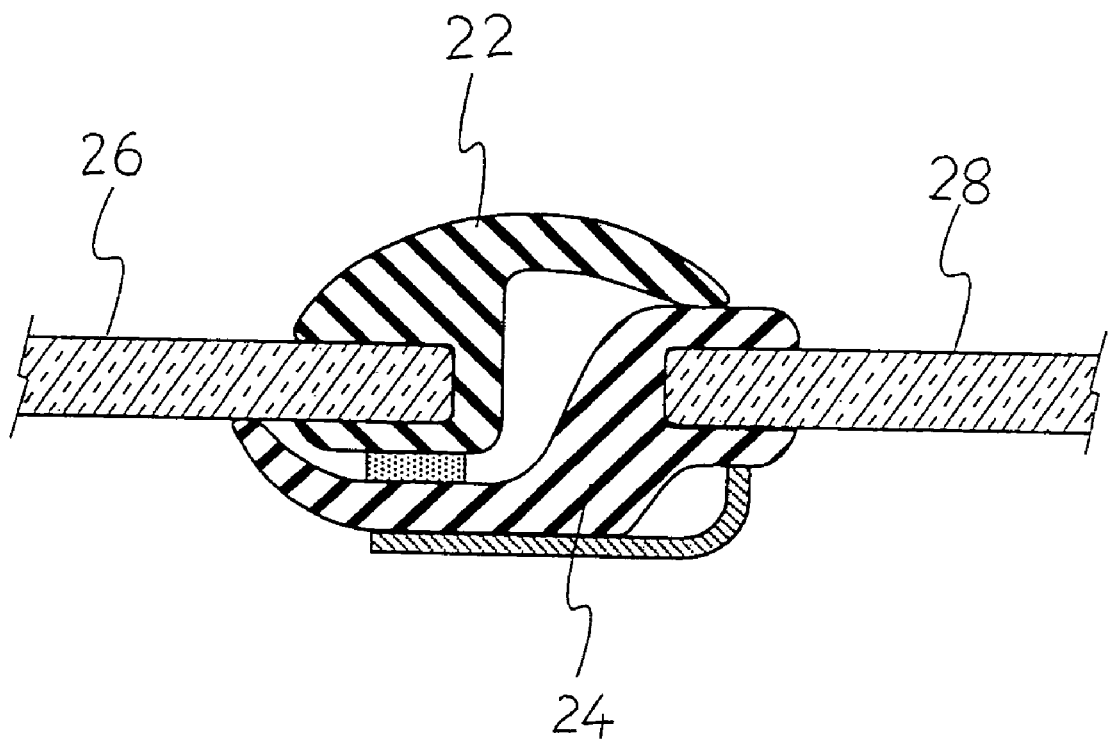
FIG. 3 is a partially cut-away cross-sectional view of another example of a conventional sealing structure.

Hereinafter, one embodiment of the sealing structure in accordance with the present invention will be explained with reference to FIGS. 4 through 9. In the present embodiment, a roof panel 10A is composed of three panels: a first panel 30, a second panel 32 and a third panel 34. As shown in FIG. 8, the first panel 30 is mounted so as to tilt up and down about a front edge thereof to lift a rear part thereof. The second panel 32 is mounted so as to be raised and lowered in an entire part thereof, and slid in a longitudinal direction of the vehicle roof. The third panel 34 is fixedly secured to a frame member 40 provided along the roof opening portion 12. The sealing structure between the first panel 30 and the second panel 32 will be mainly explained.

Figure 4:
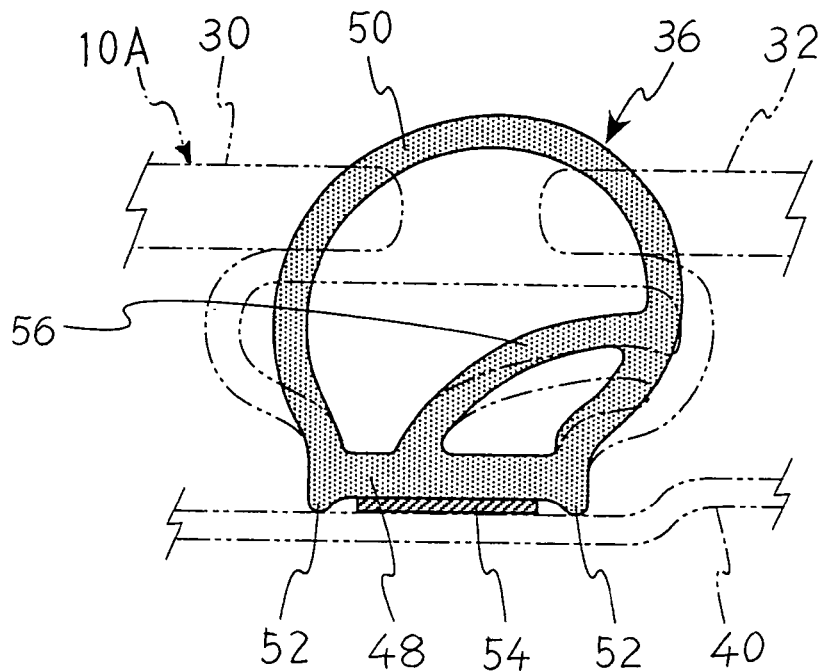
FIG. 4 is a partially cut-away cross-sectional view of a front weather strip in one embodiment of a sealing structure in accordance with the present invention, which is taken along line B—B of FIG. 6.
Figure 5:
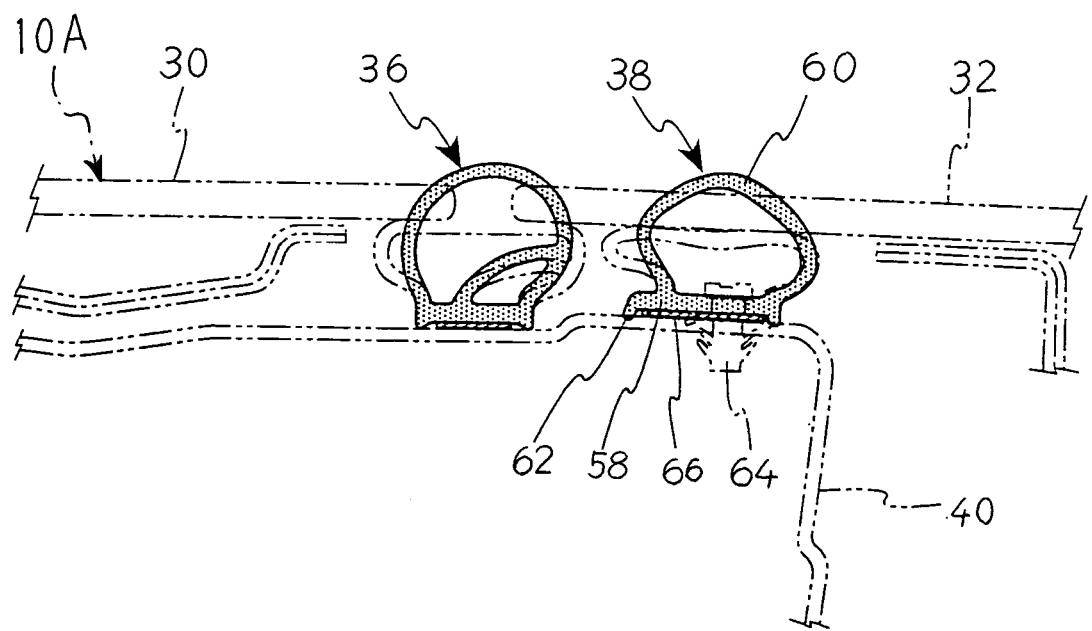
FIG. 5 is a partially cut-away cross-sectional view of one embodiment of a sealing structure in accordance with the present invention, which is taken along line B—B of FIG. 6, and shows a sealing structure between a first panel and a sliding panel.
Figure 6:
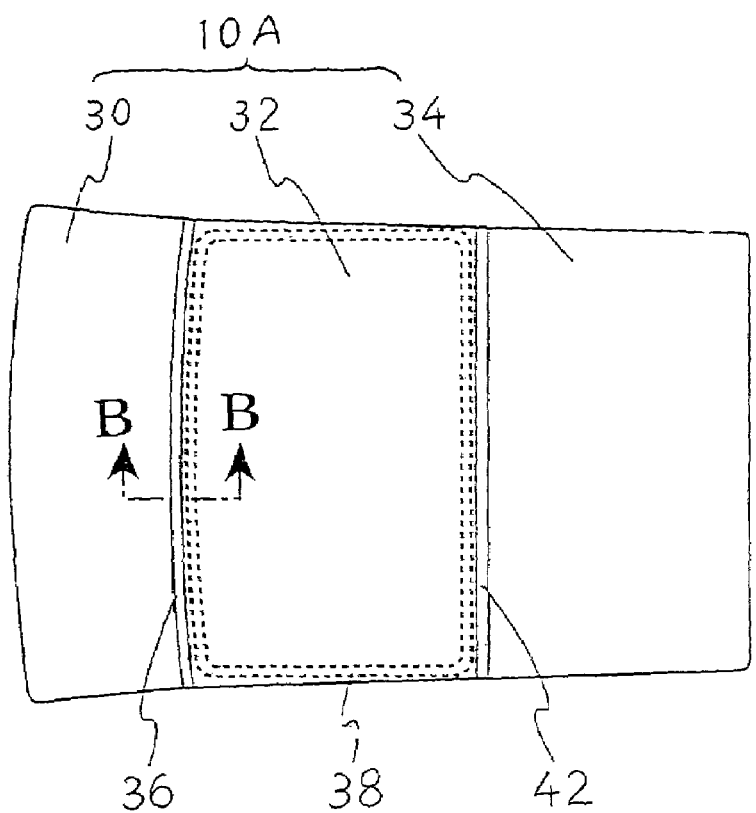
FIG. 6 is a plan view of a roof panel to which weather strips of a sealing structure in accordance with the present invention are attached.

As shown in FIG. 4, a front weather strip 36 is attached to provide a seal between a rear edge of the first panel 30 and a front edge of the second panel 32, and as shown in FIG. 5, an annular weather strip 38 is further attached on the rear side of the front weather strip 36. When the roof panel 10A is in a closed state, an upper surface of the annular weather strip 38 contacts a lower surface of a periphery of the second panel 32.

And as shown in FIG. 8, a rear weather strip 42 is further attached to provide a seal between a rear edge of the second panel 32 and a front edge of the third panel 34.

Figure 7:
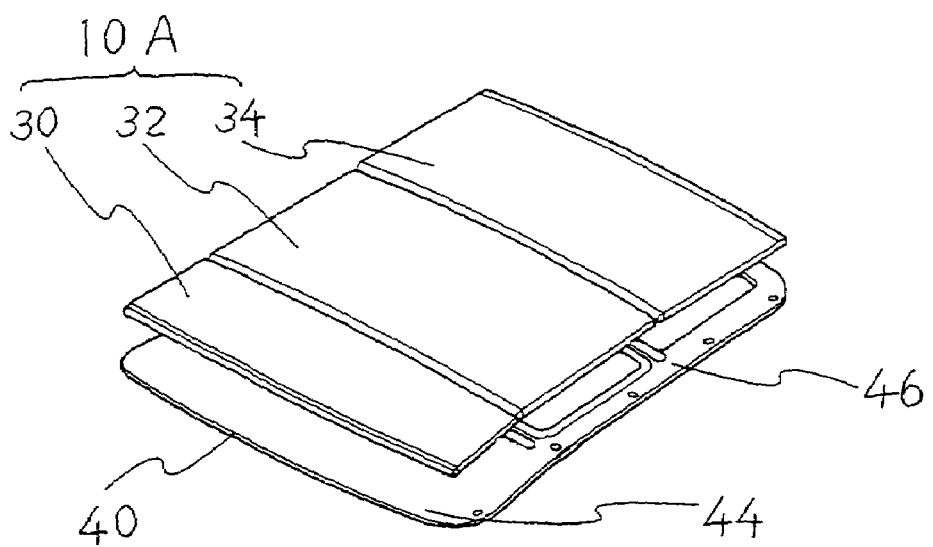
FIG. 7 is a perspective view of a roof panel composed of three panels, which is used in one embodiment of a sealing structure in accordance with the present invention.
Figure 8:
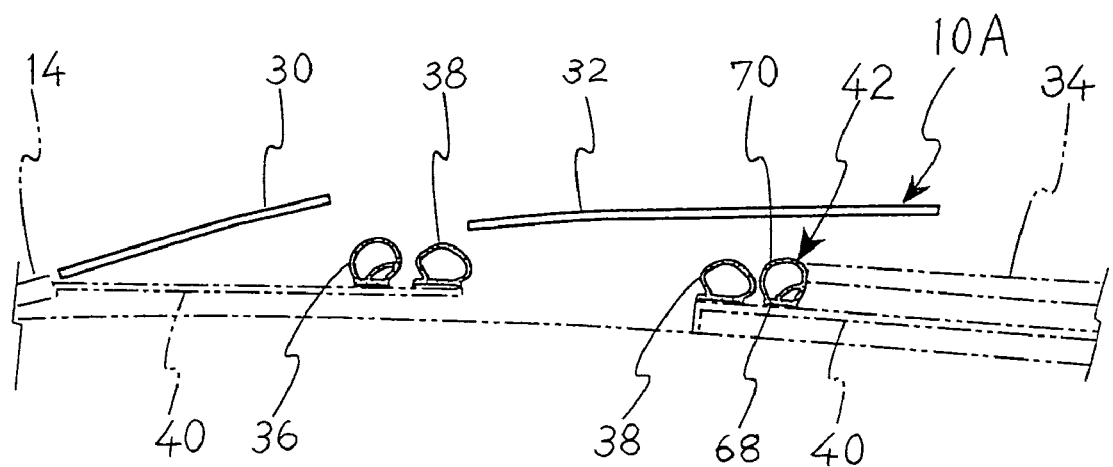
FIG. 8 is a partially cut away cross-sectional view of one embodiment of a sealing structure in accordance with the present invention, in which a sliding panel is slid rearward.

As shown in FIG. 7, the frame member 40 includes an outer frame 44 which extends around a periphery thereof, and a middle frame 46 which extends in a widthwise direction thereof to define two roof openings which respectively face the second and third panels 32 and 34.

Figure 9:
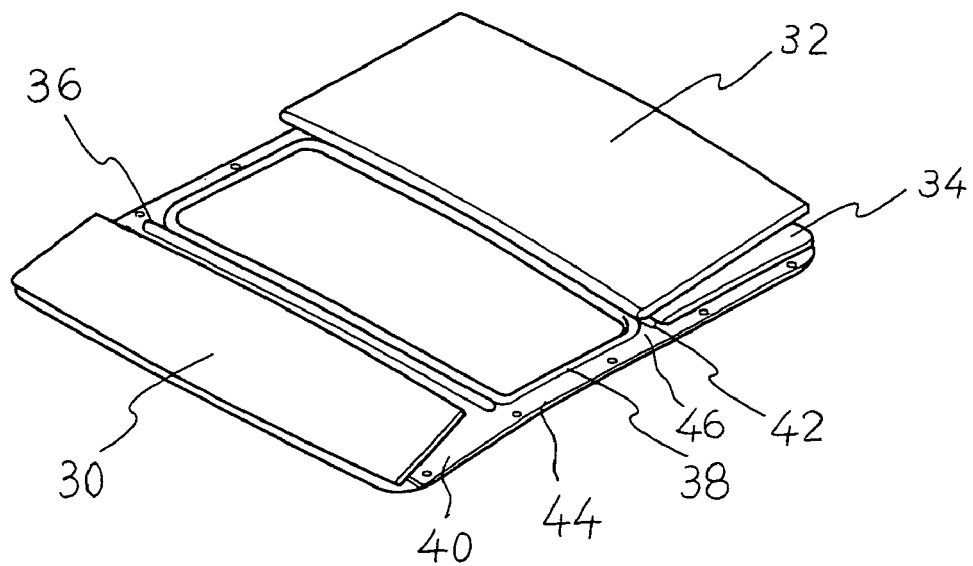
FIG. 9 is a perspective view of a roof panel in one embodiment of a sealing structure in accordance with the present invention, in which a sliding panel is slid rearward.

And, as shown in FIG. 9, the front weather strip 36 is attached to the outer frame 44 of the frame member 40 along a front side of a front roof opening, and the rear weather strip 42 is attached to the middle frame 46 of the frame member 40. The annular weather strip 38 is attached around the front roof opening on the inner side of the front weather strip 36 and the rear weather strip 42.

The front weather strip 36 is formed by extrusion into a generally straight configuration, and, as shown in FIG. 4, has a base portion 48 to be attached to the frame member 40, and a tubular seal portion 50 integrally formed with the base portion 48 on the upper side thereof for providing a seal between the first panel 30 and the second panel 32. The base portion 48 has a generally plate-shaped cross-section, and projections 52, 52 project from both edges of the base portion 48. A double-sided adhesive tape 54 is bonded to the lower surface of the base portion 48.

When the front weather strip 36 is bonded to the frame member 40 with the double-sided adhesive tape 54, the projections 52, 52 closely contact the frame member 40 to provide a seal between the base portion 48 and the frame member 40. And the double-sided adhesive tape 54 also provides a seal between the base portion 48 and the frame member 40, similarly to the projections 52, 52.

The tubular seal portion 50 is hollow, and protrudes upward from both edges of the base portion 48 into an arc-shaped cross-section. The tubular seal portion 50 has a bridge part 56 that extends across the interior space thereof while curving toward an upper part of the tubular seal portion 50. One end of the bridge part 56 is connected to the base portion 48 on the front side thereof, whereas the other end of the bridge part 56 is connected to the tubular seal portion 50 in the position slightly below the pushing position of the front edge of the second panel 32 that is slid into a closed position.

When the roof panel 10A is closed, the second panel 32 slides frontwardly, and the front edge thereof contacts and pushes the tubular seal portion 50 of the front weather strip 36. The bridge part 56 connected to the tubular seal portion 50 in the position slightly below the pushing position of the front edge of the second panel 32 prevents the deformation of the lower part of the tubular seal portion 50. Accordingly, frontward tilting of the tubular seal portion 50 can be prevented.

In addition, the bridge part 56 has a thickness at least equal to that of the tubular seal portion 50. Accordingly, the bridge part 56 exhibits greater rigidity, compared to the tubular seal portion 50, and consequently, when the tubular seal portion 50 is pushed by the second panel 32, the bridge part 56 does not bend, whereby the tubular seal portion 50 is prevented from tilting frontwardly.

Since one end of the bridge part 56 is connected to the base portion 48, the base portion 48 as well as the bridge part 56 can support the tubular seal portion 50 which is pushed frontwardly by the second panel 32, whereby the abnormally deformation of the tubular seal portion 50 can be prevented.

As a result, when the tubular seal portion 50 is pushed by the second panel 32, the upper part of the tubular seal portion 50 deforms into a depressed configuration toward the base portion 48 without deforming frontwardly, and pushed into a space between the second panel 32 and the frame member 40.

Then, the second panel 32 is further lowered to further press the tubular seal portion 50 downwardly.

The tubular seal portion 50 has a height greater than the widthwise length of the base portion 48. Accordingly, the tubular seal portion 50 of the front weather strip 36 can fill a space between the first panel 30 and the second panel 32, thereby surely sealing the same. In addition, when the tubular seal portion 50 is pushed frontwardly, the bridge part 56 prevents the tubular seal portion 50 from greatly extending in a direction of the height thereof, and consequently, prevents it from protruding outwardly from the space between the first panel 30 and the second panel 32.

The annular weather strip 38 includes extruded parts, each being formed by extrusion into a linear configuration, and molded parts which are formed by molding to connect the extruded straight parts to each other into an annular configuration. When the second panel 32 is closed, the annular weather strip 38 closely contacts the lower surface of the periphery of the second panel 32. As shown in FIG. 5, the annular weather strip 38 includes a base portion 58 to be attached to the frame member 40, and a tubular seal portion 60 integrally formed with the base portion 58 for contacting and sealing the lower surface of the second panel 32. The base portion 58 has a generally plate-shaped cross-section, and projections 62, 62 project from both edges of the base portion 58. Clips 64 are provided in the base portion 58, and a double-sided adhesive tape 66 is bonded to the lower surface of the base portion 58. The annular weather strip 38 is attached to the frame member 40 with the clips 64 and the double-sided adhesive tape 66 by fitting the clips 64 into clip holes provided in the frame member 40, and bonding the double-sided adhesive tape 66 to the frame member 40. The projections 62, 62 closely contact the frame member 40 to provide a seal between the base portion 58 and the frame member 40. The double-sided adhesive tape 66 is provided on the outer side of the clips 64 so that it can prevent rain water, etc. which flows through the space between the first panel 30 and the second panel 32 from intruding into the vehicle compartment by way of the space between the base portion 58 and the frame member 40, and clip holes of the clips 64.

The tubular seal portion 60 is hollow, and protrudes upward from both sides of the base portion 58 into an arc-shaped cross-section. When the second panel 32 is slid and lowered to close the opening of the roof opening portion 12, the tubular seal portion 60 contacts the lower surface of the second panel 32 to provide a seal along the roof opening portion 12.

As shown in FIG. 8, the rear weather strip 42 has a similar cross-section to that of the front weather strip 36. The rear weather strip 42 has a bridge part 68 which crosses the interior space thereof while curving toward an upper part of the tubular seal portion 70. The bridge part 68 prevents the abnormal deformation of the tubular seal portion 70 and improves the sealing properties thereof.

The front weather strip 36 and the rear weather strip 42 are formed by extruding synthetic rubbers such as EPDM rubber or a sponge material of thermoplastic elastomer. In the present embodiment, these weather strips are composed of the sponge material. Alternatively, only the base portion thereof may be composed of a solid material. In the case of synthetic rubbers, after the extruding step, vulcanization is carried out in a vulcanizing chamber using heated air or high frequency. Then, the vulcanized body is cut into a predetermined length.

The front weather strip 36 and the rear weather strip 42 may have molded parts in both ends thereof.

On the other hand, the annular weather strip 38 is formed by connecting extruded straight parts with molded parts, as described above.

Hereinafter, the operation of the first panel 30 and the second panel 32 upon opening and closing the roof panel 10A will be explained.

As shown in FIG. 8, when the roof panel 10A is opened, the first panel 30 is tilted up about its front edge by a driving device (not shown) to lift a rear part thereof. Then, the second panel 32 is raised and slid rearward.

When the roof panel 10A is closed, the second panel 32 is slid frontward, and then, lowered so that the front edge of the second panel 32 contacts and pushes the tubular seal portion 50 of the front weather strip 36.

Next, the first panel 30 is tilted down about the front edge thereof to lower the rear part thereof, and the rear part thereof contacts the tubular seal portion 50 of the front weather strip 36. Thus, sealing between the first panel 30 and the second panel 32 is effected. The tubular seal portion 50 of the front weather strip 36 does not deform abnormally by virtue of the bridge part 56 provided therein, thereby exhibiting excellent sealing properties.

When the second panel 32 is slid frontward, and then lowered, the rear edge of the second panel 32 contacts and pushes the tubular seal portion 70 of the rear weather strip 42 to provide a seal between the second panel 32 and the third panel 34. At this time, the lower surface of the second panel 32 contacts the tubular seal portion 60 of the annular weather strip 38 to provide a seal between the second panel 32 and the roof opening portion 12.

In the present embodiment, the roof panel is composed of three panels, and one panel thereof is a sliding panel. In addition, the present invention is applicable to the roof panel composed of two panels one of which is a sliding panel.

In the present embodiment, a third panel is fixedly secured to the frame member. In addition, the present invention is applicable to the roof panel of which a third panel is a sliding panel.

In accordance with the present invention, since a bridge part is provided in an interior space of a tubular seal portion of a weather strip adapted to provide a seal between a sliding panel and an adjacent panel of a roof panel of a motor vehicle, a sealing structure exhibiting excellent sealing properties and good appearance can be effected between the roof panel and the roof opening portion.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure for sealing between a roof cover of a motor vehicle and a roof opening portion thereof, comprising:
    a plurality of panels including at least one sliding panel, wherein the panels form the roof cover and are arranged in a longitudinal direction of a vehicle roof;
    a frame member secured along the roof opening portion under the roof cover; and
    a weather strip attached to said frame member, said weather strip including a base portion for attachment to said frame member, and a tubular seal portion which is formed integrally with said base portion on the upper side thereof for providing a seal between said sliding panel and another of said panels, said tubular seal portion having a bridge part in an interior space thereof, wherein the bridge part curves toward an upper part of said tubular seal portion, one end of said bridge part being connected to said tubular seal portion at a position slightly below a position at which an edge of said sliding panel engages the tubular seal portion when said sliding panel is closed, and the other end of said bridge part being connected to said base portion, such that when said sliding panel is slid to a closed state and into engagement with said tubular seal portion, said bridge part supports said tubular seal portion to prevent deformation of a lower part of said tubular seal portion, and when said sliding panel is lowered into said tubular seal portion, said bridge part elastically flexes to enable said upper part of said tubular seal portion to elastically contact a lower surface of said sliding panel such that when said tubular seal portion is pushed by any force generated due to sliding and lowering of said sliding panel, said bridge part prevents abnormal tilting and deformation of said tubular seal portion, to form an effective seal between said sliding panel and said other panel.

2. A sealing structure as claimed in claim 1, wherein the plurality of roof panels is composed of a first panel, a second panel and a third panel, which are respectively composed of a transparent material and are arranged in a longitudinal direction of the vehicle roof, said first panel is tiltable to lift a rear part thereof, said second panel is a sliding panel which is arranged to be raised and slid rearward, said third panel is fixedly secured to the vehicle roof, and said weather strip is provided to seal each of a space between said first panel and said second panel, and a space between said second panel and said third panel.

3. A sealing structure as claimed in claim 1, wherein said bridge part has a thickness at least equal to the thickness of said tubular seal portion.

4. A sealing structure as claimed in claim 1, wherein said tubular seal portion of said weather strip has a height greater than the widthwise length of said base portion.

5. A scaling structure as claimed in claim 1, wherein maid base portion of said weatherstrip is attached to said frame member with a double-sided adhesive tape.

6. A sealing structure as claimed in claim 1, wherein said weather strip is attached to each of a front side and a rear side of said frame member such that said tubular seal portion of said weather strip contacts each of a front edge and a rear edge of said sliding panel when said sliding panel is in a closed position, and the sealing structure further comprises an annular weather strip attached to said frame member so as to contact a lower surface of a periphery of said sliding panel, when said sliding panel is in a closed position, on an inner side of said first mentioned weather strip.

7. A scaling structure for sealing between a roof cover of a motor vehicle and a roof opening portion thereof, comprising:
    a plurality of panels including at least one sliding panel, wherein the panels form the roof cover and are arranged in a longitudinal direction of a vehicle roof;
    a frame member secured to a body of the motor vehicle about the roof opening portion and beneath the roof cover; and
    a weather strip attached to the frame member, wherein the weather strip includes:
        a base portion, which is attached to the frame member, and
        a tubular seal portion, which is formed on an upper side of the base portion and is formed integrally with the base portion, and
    the tubular seal portion forms a seal between the sliding panel and another of the panels,
    the tubular seal portion has a bridge part in an interior space thereof, one end of the bridge part being joined directly to the tubular seal portion at a position slightly below a position at which an edge of the sliding panel engages the tubular seal portion when the sliding panel is closed,
    the other end of the bridge part being joined directly to an upper surface of the base portion,
    the bridge part curves from the base portion toward en upper part of the tubular seal portion, such that when the sliding panel is slid to a closed state and into engagement with the tabular seal portion, the bridge part supports the tubular seal portion to prevent deformation of a lower part of the tubular seal portion,
    when the sliding panel is lowered into the tubular seal portion, the bridge part elastically flexes to enable the upper part of the tubular seal portion to elastically contact a lower surface of the sliding panel such tat when the tubular seal portion is pushed by any force generated due to sliding and lowering of the sliding panel, the bridge part resists abnormal tilting and deformation of the tubular seal portion, to form an effective seal between the sliding panel and the other panel.

8. A sealing structure as claimed in claim 7, wherein the plurality of roof panels is composed of a first panel, a second panel and a third panel, which are respectively composed of a transparent material and are arranged in a longitudinal direction of the vehicle roof, the first panel is tiltable to lift a rear part thereof, to second panel is a sliding panel which is arranged to be raised and slid rearward, the third panel is fixedly secured to the vehicle roof, and the weather strip is provided to seal each of a space between the first panel and the second panel, and a space between the second panel and the third panel.

9. A sealing structure as claimed in claim 7 wherein the thickness of the bridge part is at least equal to the thickness of the tubular seal portion.

10. A sealing structure as claimed in claim 7 wherein the height of the tubular seal portion of the weather strip is greater than the widthwise length of the base portion.

11. A sealing structure em claimed in claim 7, wherein the base portion of the weather strip is attached to the frame member with double-sided adhesive tape.

12. A sealing structure as claimed in claim 7, wherein the weather strip is one of two weather strips, which are identical in cross section, and the weather strips are repetitively attached to a front side and a rear side of the frame member such that tubular seal portions of the weather strips contact each of a front edge and a rear edge of the sliding panel when the sliding panel is in a closed position, and the sealing structure further comprises an annular weather strip attached to the frame member such that a surface of the annular weather strip contacts a lower surface of a periphery of the sliding panel, when the sliding panel is in a closed position.

13. A sealing structure according to claim 7, wherein a lower surface of the base portion is attached directly to the frame member with a double-sided adhesive tape, and the bridge part extends from the base member at a location of the base member that is directly above the double-sided adhesive tape.

* * * * *